United States Patent
Minakuchi et al.

(10) Patent No.: US 10,107,383 B2
(45) Date of Patent: Oct. 23, 2018

(54) BALL SCREW

(71) Applicant: NSK Ltd., Shinagawa-ku, Tokyo (JP)

(72) Inventors: Junji Minakuchi, Fujisawa (JP);
Yutaka Nagai, Fujisawa (JP); Masashi Shindo, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/121,107

(22) PCT Filed: Feb. 25, 2014

(86) PCT No.: PCT/JP2014/000987
§ 371 (c)(1),
(2) Date: Aug. 24, 2016

(87) PCT Pub. No.: WO2015/128893
PCT Pub. Date: Sep. 3, 2015

(65) Prior Publication Data
US 2017/0023124 A1    Jan. 26, 2017

(51) Int. Cl.
*F16H 55/18* (2006.01)
*F16H 57/04* (2010.01)
(Continued)

(52) U.S. Cl.
CPC ..... *F16H 57/0497* (2013.01); *F16H 25/2209* (2013.01); *F16H 25/2418* (2013.01); *F16H 57/0412* (2013.01)

(58) Field of Classification Search
CPC ............. F16H 57/0497; F16H 25/2209; F16H 25/2418; F16H 57/0412
See application file for complete search history.

(56) References Cited

U.S. PATENT DOCUMENTS 9,133,921 B2 *   9/2015  Shindo ................ F16H 57/0497
2014/0157927 A1 * 6/2014  Shindo ................ F16H 57/0497
                                                  74/424.81

FOREIGN PATENT DOCUMENTS

CN      202381636 U    8/2012
JP      10-96457 A     4/1998
(Continued)

OTHER PUBLICATIONS

International Preliminary Report on Patentability (PCT/IB/338) issued in PCT Application No. PCT/JP2014/000987 dated Aug. 25, 2016, including English translation of document C2 (Japanese-language International Preliminary Report on Patentability (PCT/IPEA/409)) previously filed on Aug. 24, 2016 (five (5) pages).
(Continued)

*Primary Examiner* — Zakaria Elahmadi
(74) *Attorney, Agent, or Firm* — Crowell & Moring LLP

(57) ABSTRACT

There is provided a ball screw that is used to apply a preload to balls and that has a configuration of achieving a balance between the cooling efficiency and ease of assembly and disassembly. To this end, the ball screw includes a screw shaft, and a plurality of nuts movable relative to the screw shaft in an axial direction. Each of the nuts includes flow channels, which are cooling mechanisms and which respectively serve as independent channels to allow a cooling medium to pass through them. These flow channels are provided symmetrically with respect to a space between the nuts, and are configured so that the cooling medium can independently circulate in each of the nuts.

2 Claims, 3 Drawing Sheets

(51) Int. Cl.
*F16H 25/22* (2006.01)
*F16H 25/24* (2006.01)

(56) References Cited

FOREIGN PATENT DOCUMENTS

| | | |
|---|---|---|
| JP | 2000-18363 A | 1/2000 |
| JP | 2010-133556 A | 6/2010 |
| JP | 2012-77905 A | 4/2012 |

OTHER PUBLICATIONS

International Search Report (PCT/ISA/210) issued in PCT Application No. PCT/JP2014/000987 dated May 13, 2014, with English translation (two (2) pages).
Japanese-language International Preliminary Report on Patentability (PCT/IPEA/409) issued in PCT Application No. PCT/JP2014/000987 dated Mar. 7, 2016 (three (3) pages).
Chinese Office Action issued in counterpart Chinese Application No. 201480000077.7 dated Apr. 1, 2017 with English translation (14 pages).

\* cited by examiner

BALL SCREW

TECHNICAL FIELD

The present invention relates to ball screws, more particularly to a ball screw having a function to cool a nut.

BACKGROUND ART

There has heretofore been known a ball screw which includes a screw shaft, and a nut that is screwed to the screw shaft via plural rolling elements (e.g., balls) and in which the screw shaft and the nut are relatively rotatable. In this ball screw, frictional heat resulting from a point contact or surface contact is generated between the screw shaft and the nut during rotation. Hence, a cooling portion to reduce the frictional heat is provided in some cases.

Types of installing the cooling portion in the conventional ball screw include a shaft center cooling type and a nut cooling type. The shaft center cooling type is a configured such that the screw shaft is a cooling target so that the cooling portion is provided in the screw shaft. As an example of this shaft center cooling type, the screw shaft is hollow to allow a cooling medium to flow through the screw shaft. The nut cooling type is configured such that the nut is a cooling target and the cooling portion is provided in the nut.

Here, the shaft center cooling type may have a drawback in cost for making a hollow hole in the screw shaft, when the shaft center cooling type is used in a large and long ball screw device. Therefore, the nut cooling type is often used.

The technique disclosed in Patent Literature 1 is given as the ball screw using such a nut cooling type is. Specifically, according to the technique in Patent Literature 1, a cooling medium is made to pass through a flow channel provided in a nut in an axial direction to cool the nut.

CITATION LIST

Patent Literature

PTL 1: JP 2010-133556 A

SUMMARY OF INVENTION

Technical Problem

The mainly used ones of recent large and long ball screws are ball screws manufactured by using double nut preload. In such ball screws, it is important to efficiently cool plural nuts, and prevent leakage of the cooling medium during disassembly, assembly, and maintenance.

However, even when the ball screw disclosed in Patent Literature 1 is applied to the ball screw manufactured by using the double nut preload, there is room for improvement in providing a ball screw which achieves a balance between efficient cooling of plural nuts and the prevention of the leakage of the cooling medium.

The present invention has been made to address the above drawbacks, and has an object to provide a ball screw, which achieves a high cooling efficiency, which prevents the leakage of a cooling medium even during disassembly, assembly, and maintenance, and which achieves a well balance between the cooling efficiency and the prevention of leakage.

Solution to Problem

To achieve the above object, a ball screw according to one embodiment of the present invention includes: a screw shaft in which a spiral groove is arranged on an outer circumferential surface;

two nuts, each of which includes a spiral groove facing the spiral groove of the screw shaft, and which are screwed to the screw shaft via a plurality of balls disposed between the spiral grooves of the two nuts and the spiral groove of the screw shaft; and a preload application member configured to apply a preload to the balls, wherein cooling portions are independently provided in the two nuts, respectively, wherein the cooling portions are respectively provided in the nuts to be symmetric with respect to a space between the two nuts, wherein each of the cooling portions is a flow channel to pass a cooling medium, wherein the flow channel comprises at least one of an axial flow channel extending in an axial direction or a circumferential flow channel provided to intersect perpendicularly to the axial direction, wherein the preload application member is a spacer which is coaxial with the two nuts and which is disposed between the two nuts, wherein the axial flow channel is provided through each of the two nuts in the axial direction, and wherein a seal portion is provided coaxially with the two nuts, the seal portion being provided at an end of each of the two nuts and having one surface forming the axial flow channel and the circumferential flow channel and another surface in contact with the spacer.

That is, in a ball screw according to one embodiment of the present invention including a screw shaft in which a spiral groove is arranged on an outer circumferential surface; two nuts, each of which includes a spiral groove facing the spiral groove of the screw shaft, and which are screwed to the screw shaft via a plurality of balls disposed between the spiral grooves of the two nuts and the spiral groove of the screw shaft; and a preload application member configured to apply a preload to the balls, cooling portions (cooling mechanisms) are independently provided in the two nuts, respectively, and the cooling portions are respectively provided in the nuts to be symmetric with respect to a space between the two nuts. The above-described two nuts are incorporated by coupling, connecting, or adjacently arranged.

Here, in the ball screw, each of the cooling portions is a flow channel to pass a cooling medium, and the flow channel may include at least one of an axial flow channel extending along the axial direction and a circumferential flow channel provided so as to intersect at right angles with the axial direction. That is, each of the cooling portions has a flow channel to pass the cooling medium as an independent channel. Each of these flow channels includes at least one of an axial flow channel and a circumferential flow channel. The axial flow channel is a flow channel axially provided between the inner circumference of the nut and the outer circumference of the nut. The circumferential flow channel is a flow channel provided between the inner circumference of the nut and the outer circumference of the nut in a direction that intersects at right angles with the axis of the nut. The cooling portions are configured so that the cooling medium can independently circulate in each of the nuts.

The ball screw may be configured so that each of the nuts is provided with an inflow opening which is coupled to the flow channels and into which the cooling medium flows, and a discharge opening which is coupled to the flow channels and which discharges the cooling medium. That is, each of the nuts may be configured to have at least one pair of an inflow opening which is an inflow portion for the cooling medium and a discharge opening which is an outflow portion.

The ball screw may be configured so that the preload application member is a spacer which is coaxial with the two nuts and which is disposed between the two nuts.

As the preload application member, it is possible to use a configuration which uses, for example, fixed position preload produced by a positional adjustment between the nuts, constant pressure preload produced by an elastic body such as a spring, or variable control preload to set a predetermined preload load by using fluid pressure or an actuator such as a piezoelectric element. More specifically, it is possible to use a configuration in which the above configuration of the preload is disposed between the nuts so that a plurality of nuts press or pull one another.

Advantageous Effects of Invention

According to one aspect of the present invention, it is possible to provide a ball screw, which achieves a high cooling efficiency, which prevents leakage of a cooling medium even during disassembly, assembly, and maintenance, and which achieves a well balance between the cooling efficiency and the prevention of leakage.

DESCRIPTION OF EMBODIMENTS

Embodiments of the present invention will now be described with reference to the drawings.

Figure 1:
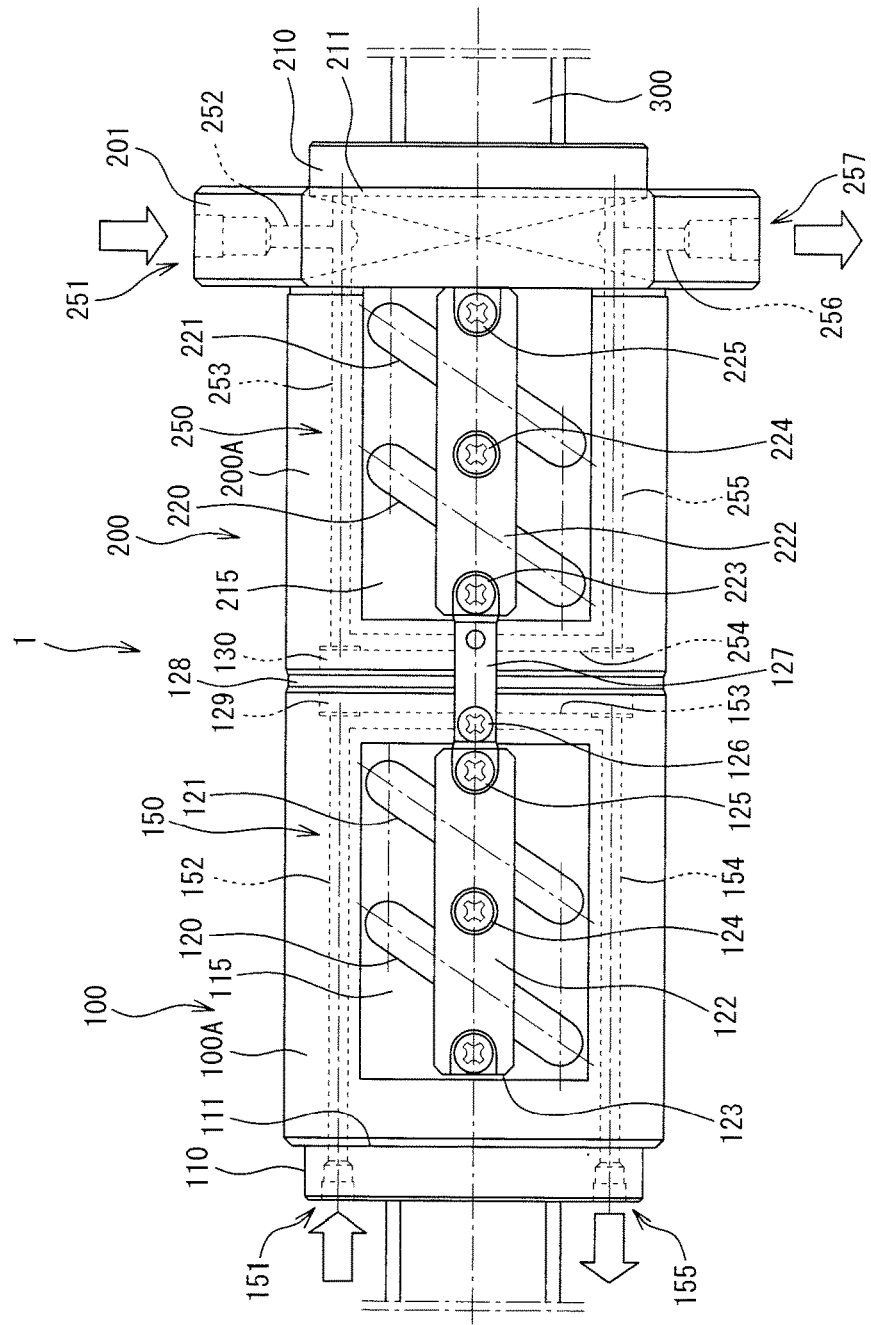
FIG. 1 is a side view of a configuration of a ball screw in one embodiment of the present invention.
Figure 2:
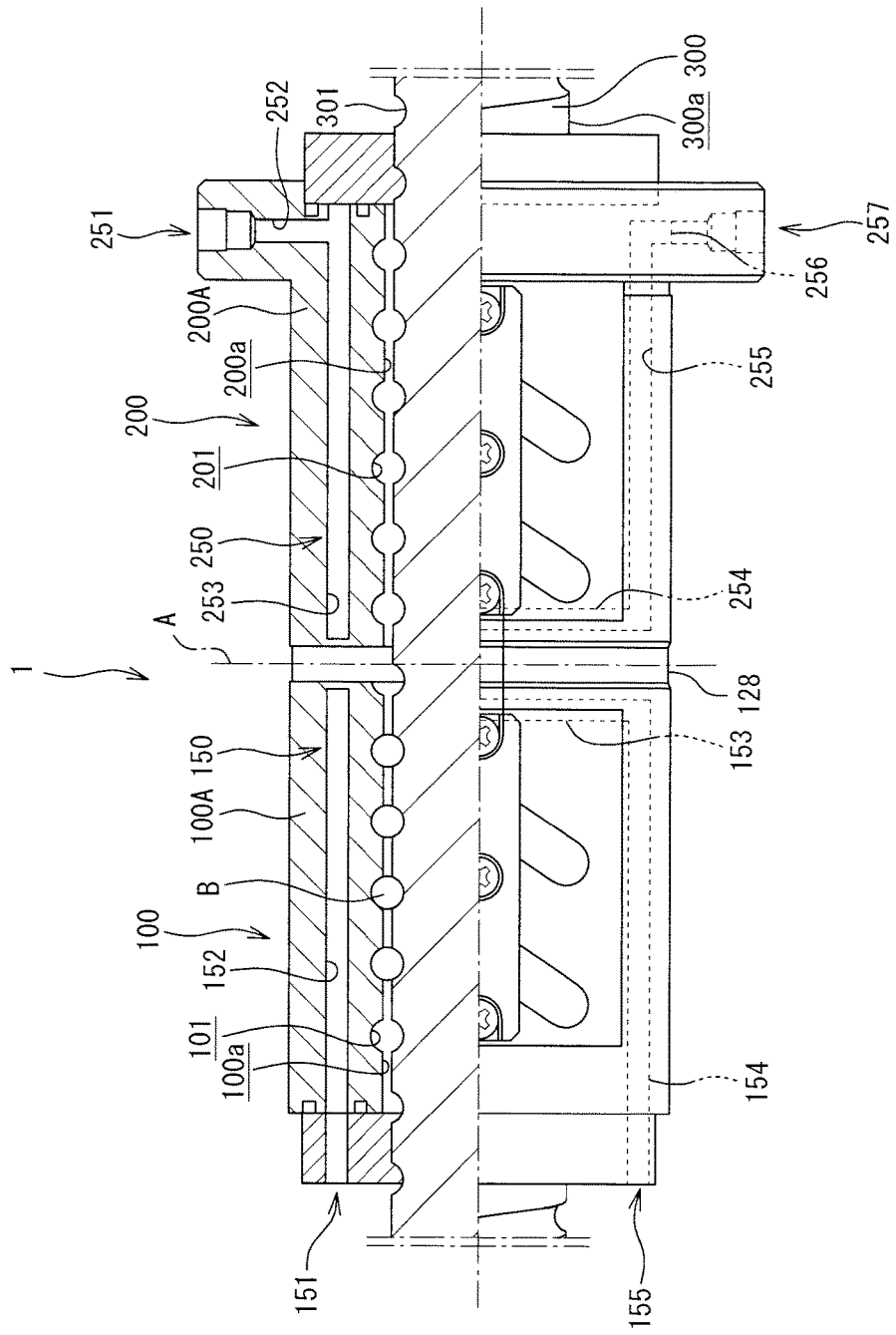
FIG. 2 is a partial sectional view of a configuration of the ball screw in one embodiment of the present invention.
Figure 3:
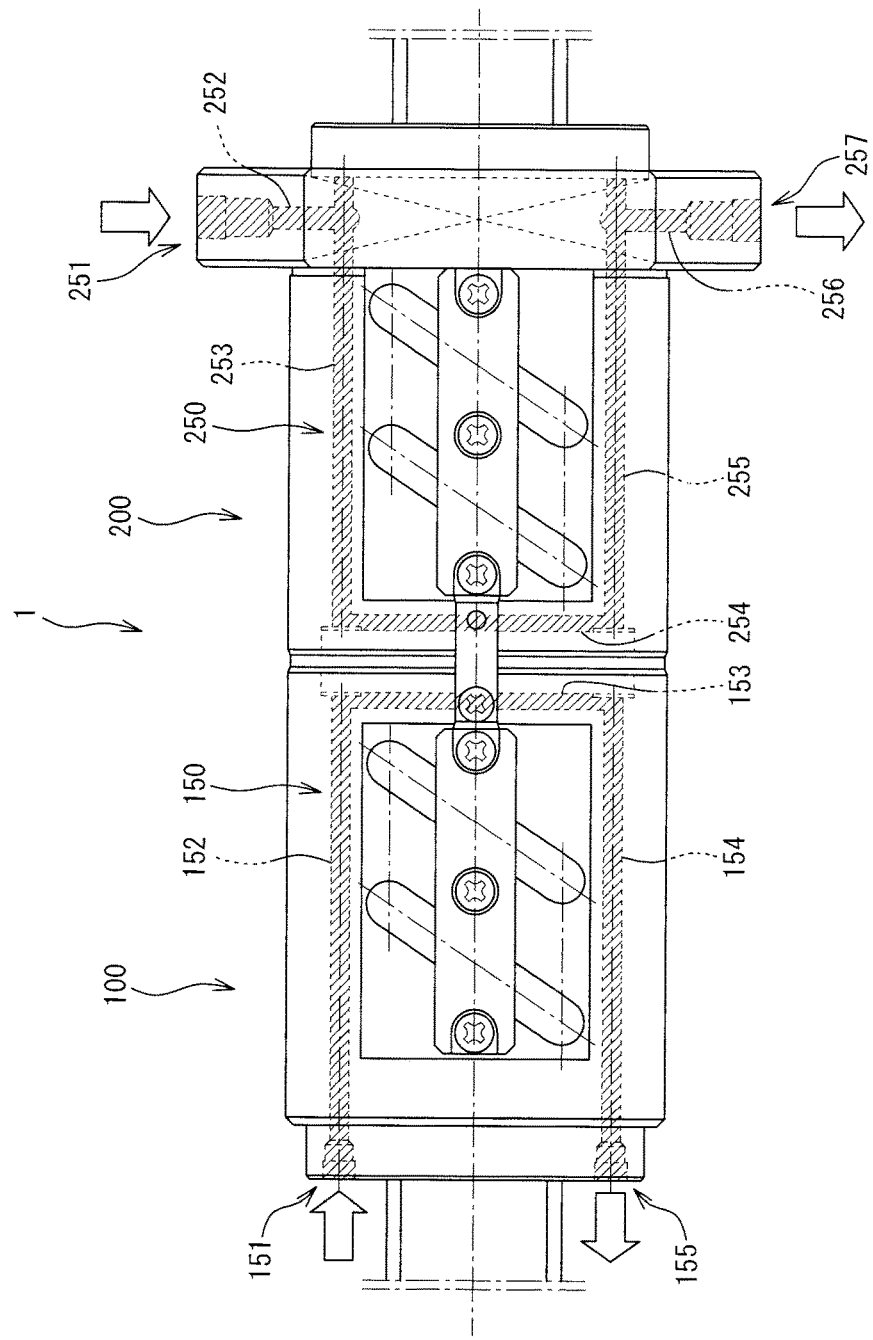
FIG. 3 is a side view of a configuration of the ball screw in one embodiment of the present invention.

FIG. 1 is a side view of a configuration of a ball screw in one embodiment of the present invention. FIG. 2 is a partial sectional view of a configuration of the ball screw in one embodiment of the present invention. FIG. 3 is a side view of a configuration of the ball screw in one embodiment of the present invention, and flow channels are highlighted by hatching.

As illustrated in FIG. 1, a ball screw 1 in one embodiment of the present embodiment includes two nuts (which are a first nut 100 and a second nut 200), a screw shaft 300, and a preload application member which is provided between the two nuts and which is configured to apply preload to the ball.

Nuts

The first nut 100 includes a body portion 100A cylindrically formed to have an inside diameter larger than the outside diameter of the screw shaft 300, a cap 110, and tubes 120 and 121. The cap 110 is attached to one end of the body portion 100A by, for example, unillustrated screws via a seal material 111. The tubes 120 and 121 are members for rolling element circulation provided in a flat portion 115 of the outer circumferential surface of the body portion 100A, and are fixed by a holding plate 122 fastened to the first nut 100 by screws 123 to 125. The first nut 100 is known as a flangeless type nut.

The second nut 200 includes a body portion 200A cylindrically formed to have an inside diameter larger than the outside diameter of the screw shaft 300, a flange portion 201 provided at one end of the body portion 200A, a cap 210, and tubes 220 and 221. The cap 210 is attached to an end of the body portion 200A by, for example, unillustrated screws via a seal material 211. The tubes 220 and 221 are members for rolling element circulation provided in a flat portion 215 of the outer circumferential surface of the body portion 200A, and are fixed by a holding plate 222 fastened to the second nut 200 by screws 223 to 225.

Here, as illustrated in FIG. 2, a spiral groove 101 is formed on an inner circumferential surface 100a of the first nut 100 so as to face a spiral groove 301 spirally formed on an outer circumferential surface 300a of the screw shaft 300. The spiral groove 201 is also formed on an inner circumferential surface 200a of the second nut 200 so as to face the spiral groove 301 of the screw shaft 300. The first nut 100 and the second nut 200 are coaxially arranged in the axial direction of the screw shaft 300, and are screwed with the screw shaft 300 by plural rolling elements B provided between the spiral groove 101 and the spiral groove 201. Thus, the rolling elements B are capable of rolling through a rolling channel formed by the spiral groove 301 and the spiral grooves 101 and 201, so that the screw shaft 300, and the first nut 100, and the second nut 200 can relatively move in the axial direction.

Preload Application Member

As illustrated in FIG. 1 and FIG. 2, a spacer 128 is provided coaxially with the first nut 100 and the second nut 200 between the other end of the first nut 100 and the other end of the second nut 200 via seal materials 129 and 130. The first nut 100 and the second nut 200 are coupled to each other by a coupling member 127 via the spacer 128 and the seal materials 129 and 130. Only one coupling member 127 is illustrated in FIG. 1 and FIG. 2, but the first nut 100 and the second nut 200 may be coupled to each other at plural places by plural coupling members 127 as needed.

Thus, the first nut 100 and the second nut 200 are coupled to each other by the coupling member 127 via the spacer 128, so that the spacer 128 and the coupling member 127 function as preload application members, leading to a state in which what is known as fixed position preload is applied. In the ball screw 1 in one embodiment of the present invention, two-point contact preload in a pulling direction is applied to the first nut 100 and the second nut 200 to cancel an increase in preload torque caused by cooling the first nut 100 and the second nut 200. This configuration enables efficient cooling of the first nut 100 and the second nut 200.

As the preload application member, it is possible to select a configuration which uses, for example, not only the fixed position preload produced by a positional adjustment between the above nuts 100 and 200 but also constant pressure preload produced by an elastic body such as a spring, fluid pressure preload, or variable control preload to set a predetermined preload by using an actuator such as a piezoelectric element.

Cooling Portions

The first nut 100 and the second nut 200 respectively include cooling portions 150 and 250 which independently cool the nuts 100 and 200. These cooling portions 150 and 250 are respectively arranged in the nuts 100 and 200 symmetrically with respect to a virtual area between the two nuts 100 and 200. The area is a virtual plane A (see FIG. 2)

extending through the midpoint in the axial direction of the spacer 128 and passing perpendicularly to the axial direction. The provision of the cooling portions 150 and 250 keeps the weight balance of a ball screw device, and does not prevent smooth activation. Here, the configurations of the cooling portions 150 and 250 are not limited in particular, as long as the cooling portions 150 and 250 are provided symmetrically with respect to the virtual area between the two nuts 100 and 200, and as long as the cooling portions 150 and 250 independently cool the first nut 100 and the second nut 200, respectively. A suitable configuration can be selected depending on the purpose.

For example, as illustrated in FIG. 1 and FIG. 2, the cooling portions 150 and 250 include plural flow channels 152 to 154 and 252 to 256 which are respectively pierced in the first nut 100 and the second nut 200 so that a cooling medium can pass through them. Each of these flow channels can include at least one of an axial flow channel extending in the axial direction and a circumferential flow channel provided to intersect perpendicularly to the axial direction. The aforementioned "axial flow channel" includes the axial flow channels 152 and 154 extending in the axial direction in the first nut 100, and axial flow channels 253 and 255 extending in the axial direction in the second nut 200. Among these axial flow channels 152, 154, 253, and 255, the axial flow channel 152 and the axial flow channel 253 are flow channels symmetrically provided between the two nuts 100 and 200. The axial flow channel 154 and the axial flow channel 255 are flow channels symmetrically provided in the nuts 100 and 200, respectively.

The aforementioned "circumferential flow channel" includes the circumferential flow channel 153 provided in the circumferential direction to intersect perpendicularly to the axial direction in the first nut 100, and the circumferential flow channels 252, 254, and 256 provided in the circumferential direction to intersect perpendicularly to the axial direction in the second nut 200. Among these circumferential flow channels 153, 252, 254, and 256, the circumferential flow channel 153 and the circumferential flow channel 254 are flow channels symmetrically provided in the nuts 100 and 200, respectively. In this way, the cooling portions 150 and 250 are configured to allow the cooling medium to independently circulate in each of the nuts 100 and 200.

In the ball screw 1 in one embodiment of the present invention, an inflow opening 151 which is coupled to the flow channels 152 to 154 and into which the cooling medium flows, and a discharge opening 155 configured to discharge the cooling medium may be provided in the first nut 100. Moreover, in the ball screw 1 in one embodiment of the present invention, an inflow opening 251 which is coupled to the flow channels 252 to 256 and into which the cooling medium flows, and a discharge opening 257 configured to discharge the cooling medium may be provided in the second nut 200. That is, each of the nuts 100 and 200 may include at least one pair of the inflow opening 151 or 251, which is an inflow portion for the cooling medium, and a discharge opening 155 or 257, which is a discharge portion.

Therefore, as illustrated in FIG. 1 to FIG. 3, the cooling portion 150 of the first nut 100 includes the inflow portion 151 provided at the end of the cap 110 in the axial direction, the axial flow channel 152, the circumferential flow channel 153, the axial flow channel 154, and the discharge portion 155 provided at the end of the cap 110 in the axial direction. That is, a single independent system of flow channel is formed in the first nut 100. Two or more systems of flow channels may be provided as long as the flow channels are independently provided in each of the nuts 100 and 200.

As illustrated in FIG. 1 to FIG. 3, the cooling portion 250 of the second nut 200 includes the inflow portion 251 provided in the outer circumference of the flange portion 201 in a direction that intersects perpendicularly to the axis, the circumferential flow channel 252, the axial flow channel 253, the circumferential flow channel 254, the axial flow channel 255, the circumferential flow channel 256, and the outflow portion 257 provided in the outer circumference of the flange portion 201 in the direction that intersects perpendicularly to the axis. That is, a single independent system of flow channel is formed in the second nut 200. Two or more systems of flow channels may be provided as long as the flow channels are independently provided in each of the nuts 100 and 200.

Here, tube taper screws for pipe fastening are provided in the inflow portions 151 and 251 and the discharge portions 155 and 257, so that pipes are connected to these tube taper screws. This configuration enables supply and discharge of the cooling medium.

Cooling Medium

Various gases and liquids can be used as a fluid to serve as the cooling medium. As a gas, not only air or compressed air but also nitrogen, an inert gas (e.g., argon), hydrocarbon (e.g., butane or isobutane), helium, ammonia, carbon dioxide, or a mixture of the above gases can be used. As a liquid, not only water but also a coolant in which antirust is added to water, a coolant in which various additives are added to water, or various oils as cooling medium oils can be used. Specifically, mineral oils, animal and vegetable oils, or synthetic oils can be used. A suitable one of the above may be selected depending on, for example, the use environment. Further, the temperature of the cooling medium may be managed and the flow volume may also be managed. The cooling medium may be used in a turbulent state.

In one embodiment of the present invention, the temperature can be managed in each nut, and, for example, the preload can be controlled.

Furthermore, the positions and sizes of the inflow portions and the discharge portions, and the sectional shape and sectional area of each flow channel can be suitably adjusted depending on the use condition.

According to the ball screw in one embodiment of the present invention, the preload load can be higher, and the ball screw can therefore be suitably applied to what is known as a large-sized ball screw (i.e., the outside diametrical dimension of the screw shaft 300 is substantially 80 nm or more).

According to the ball screw in one embodiment of the present invention, the cooling medium can independently circulate in each of the nuts. Thus, the cooling efficiency is high. Such a high cooling efficiency allows the nuts to be cooled firstly. Then, and the effects of the cooling are transmitted to the balls that are the rolling elements from the spiral grooves on the inner circumferences of the nuts and further transmitted to the spiral groove of the screw shaft, and also cools the screw shaft. The preload change and the deterioration of lubrication caused by heat generation are prevented, accordingly. The cooling effects are remarkably exhibited, when the preload load is relatively high and when the contact states between the spiral grooves and the rolling elements, and the spiral grooves and the rolling elements are maintained. Therefore, the ball screw according to the present invention is suitable to a relatively large-sized ball screw.

According to the ball screw in one embodiment of the present invention, even a long (i.e., about 4 m or more) ball screw in which the use of what is known as the shaft center cooling type is difficult can be applied without the shaft center cooling, but the shaft center cooling can be used together when necessary.

Furthermore, according to the ball screw in one embodiment of the present invention, the flow channel of the cooling medium for cooling is independently provided in each of the nuts. Therefore, for example, even at the time of maintenance in which some of the nuts need to be replaced, the leakage of the cooling medium during maintenance can be effectively prevented when piping to each of the cooling medium flow channels is blocked.

Thus, the ball screw in one embodiment of the present invention can be suitably used as a ball screw which demands processing accuracy in particular and which is used in what is known as a linearly moving part of a large-sized machine tool that may be subject to the maintenance.

The ball screw in one embodiment of the present invention achieves a high cooling efficiency. Hence, there are no significant changes in the preload and the length of the screw shaft, and excessive heat generation is prevented. Therefore, no significant deterioration of a lubricant can be found. Accordingly, there is no significant deterioration in positioning accuracy of the linearly moving part caused by heat generation in the ball screw, a stable operation in which what is known as torque variation is small can be maintained for a long period of time, and such advantages can be found at even a long screw shaft. Consequently, the ball screws in some embodiments of the present invention are particularly applicable as ball screws used in linearly moving parts of large-sized machine tools for high-precision processing. The ball screw in one embodiment of the present invention can be used together with the shaft center cooling.

The ball screws in some embodiments of the present invention are applicable as ball screws used in linearly moving parts of large-sized machine tools for high-precision processing.

While the embodiments of the present invention have been described above, the present invention is not limited thereto, and various modifications and improvements can be made.

REFERENCE SIGNS LIST 1 ball screw
100 first nut
150 cooling portion
200 second nut
250 cooling portion
300 screw shaft

The invention claimed is:

1. A ball screw comprising:
a screw shaft in which a spiral groove is arranged on an outer circumferential surface;
two nuts, each of which includes a spiral groove facing the spiral groove of the screw shaft, and which are screwed to the screw shaft via a plurality of balls disposed between the spiral grooves of the two nuts and the spiral groove of the screw shaft; and
a preload application member configured to apply a preload to the balls,
wherein cooling portions are independently provided in the two nuts, respectively,
wherein the cooling portions are respectively provided in the two nuts to be symmetric with respect to a space between the two nuts,
wherein each of the cooling portions is a flow channel to pass a cooling medium,
wherein the flow channel comprises at least one of an axial flow channel extending in an axial direction and circumferential flow channels provided to intersect perpendicularly to the axial direction,
wherein the preload application member is a spacer which is coaxial with the two nuts and which is disposed between the two nuts,
wherein the axial flow channel is provided through each of the two nuts in the axial direction,
wherein a seal portion is provided coaxially with the two nuts, the seal portion being provided at an end of each of the two nuts and having one surface forming the axial flow channel and the circumferential flow channels and another surface in contact with the spacer,
wherein, among the circumferential flow channels, two of the circumferential flow channels are flow channels symmetrically provided in the two nuts, respectively,
wherein the cooling medium independently circulates in each of the two nuts,
wherein the circumferential flow channels include circumferential flow channels provided in a circumferential direction to intersect perpendicularly to the axial direction at insides of end sides of the two nuts respectively,
wherein the spacer is provided between an end of a first nut of the two nuts and an end of a second nut of the two nuts, and
wherein the first nut and the second nut are coupled to each other by a coupling member via the spacer for applying fixed position preload.

2. The ball screw according to claim 1, wherein each of the two nuts is provided with an inflow opening which is coupled to the flow channels and into which the cooling medium flows, and a discharge opening which is coupled to the flow channels and which discharges the cooling medium.

* * * * *